Aug. 20, 1963     B. O. STEWART     3,101,105
HUMIDIFICATION OF WOOD FIBER SHEETS
Filed March 14, 1960

*INVENTOR.*
Basil O. Stewart
BY
*Robert F. Hause*
ATTORNEY

United States Patent Office 3,101,105
Patented Aug. 20, 1963

3,101,105
HUMIDIFICATION OF WOOD FIBER SHEETS
Basil O. Stewart, Kenmore, N.Y., assignor to National Gypsum Company, Buffalo, N.Y., a corporation of Delaware
Filed Mar. 14, 1960, Ser. No. 14,851
6 Claims. (Cl. 144—327)

This invention relates to a method of mechanically humidifying a substantially bone dry wood fiber sheet to bring the moisture content thereof up to the percentage to which it naturally would tend to come under normal atmospheric conditions, and particularly a method of providing uniform humidification of a previously oven dried or high temperature, high pressure consolidated wood fiber sheet by markedly quicker means than heretofore.

In the manufacture of wood fiber sheets, such as either hardboard or low density panels, tile or sheathing, a wet mat of fibers is first formed, as by felting, and is subsequently dried in low density form in dryers by forced circulation therein of warm, dry air. Following the drying process, in either the subsequent finishing processes or storage, a bone-dry sheet will tend slowly to take on moisture from the atmosphere until it contains a normal humidity of about 5% to 10% moisture content. If allowed to come to normal humidity by taking moisture from the atmosphere in this manner, the absorption of the moisture proceeds very slowly and unevenly. Decreasing drier time to stop the drying process when normal humidity is reached is undesirable since the moisture in the sheet at such time is very unevenly distributed there throughout and further, it is very difficult to control the drying time to obtain a desired moisture content.

In the subsequent use of low density wood fiber products, such as sheathing, it is preferable that the product have slightly more moisture content than equilibrium, since a shrinkage resulting from a slight subsequent drying after application to building studs is of no substantial harm, whereas an expansion and bulging due to a further absorption of moisture after application to building studs is a definitely undesirable condition.

Alternatively, if the low density sheet is to be used in the manufacture of hardboard, a rapid, highly even humidification of the board immediately following the high temperature, high pressure consolidation to the high density condition, is even more essential and critical, since otherwise a problem of warpage is created.

Considerable effort has been made in the past to provide controlled humidification of the dried wood fiber sheets, such as by elaborate vapor chambers subjecting all surfaces evenly to the water vapors. The cost of such equipment and the time required for such an operation, however, is unduly high.

It is a principal object of the present invention to provide a method of susbtantially instantaneously increasing the moisture content of the wood fiber sheet product with uniform distribution of the moisture throughout the wood fiber sheet product.

It is a further object of the invention to provide such method with a requirement only of relatively inexpensive, easily operable equipment subject to complete ease of control.

These and other objects of the invention will be more readily apparent when considered in relation to the preferred embodiment as set forth in the specification and shown in the drawings in which.

In the art of making wood fiber board products, there are primarily two processing steps involving the increasing of the moisture content of a wood fiber board. After forming a water laid web of wood fiber into board form, the board is normally dried to substantially bone-dry condition.

Unless this dried low density board is to be immediately consolidated into hardboard under high temperature, high pressure conditions, its subsequent treatment will include a humidification to increase the moisture content to about 7% to 13% of the board weight. If the board is consolidated into a high density hardboard, a humidification will follow consolidation to increase the moisture content to about 5% to 9% of the board weight.

Figure 1:
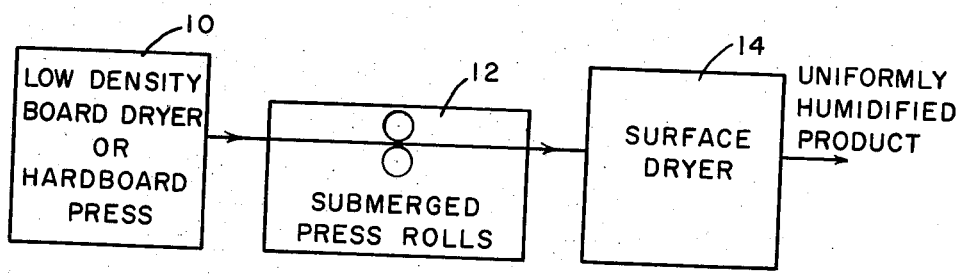
FIG. 1 is a schematic diagram of the method of the present invention.
Figure 2:
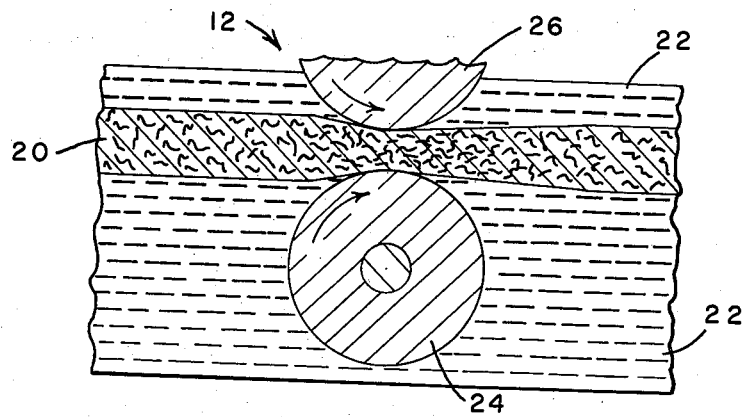
FIG. 2 is a side sectional view of the wood fiber sheet undergoing humidification in accordance with the invention.

It is the above described humidification step with which the present invention is concerned. FIG. 1 shows schematically, the process of the invention wherein either low density wood fiber board from a conventional dryer or high density wood fiber hardboard from a conventional hardboard high temperature, high pressure consolidating platen press, either designated as 10, is rolled between submerged press rolls 12 in accordance with the invention, and subsequently surface dried at 14, to remove excess non-absorbed water, providing a finished uniformly humidified product.

In the humidification of low density wood fiber board, a board 20, subsequent to drying, having a moisture content of from 0% to 2% is placed under water 22, and rolled between two rolls 24, 26 which are so disposed that the board 20, for a substantial distance after emerging from beneath the rolls, remains submerged in the water 22. This is provided by rotatably disposing a lower roll 24 completely submerged in a tank of water 22 and rotatably mounting an upper roll 26 directly thereover with at least a portion of roll 26 disposed within the water 22.

The rolls 24, 26 are arranged to provide an evenly distributed load across the board width as the board passes through the nip between the rolls. This load will need to be varied with the diameter of rolls 24, 26, rate of travel through rolls 24, 26, variation in the density of the board, the resiliency of the board, water temperature and the ultimate moisture content desired within the board. It will be apparent that, since the load should never exceed an amount which would crush or otherwise damage the board or, in other words, never exceed the elastic limit, a lesser load may be used with a plurality of passes of the board to obtain the highest degree of humidification. A normal degree of humidification desired in low density wood fiber board is from about 8% to 13% moisture, and a 300 pound per lineal inch load on rolls 24, 26, of six inch diameter has been found to provide a highly uniform humidification within this range with low density board of about 0.4 specific gravity, water temperature of 150° F., rate of travel through rolls of about 100 feet per minute, and normal resiliency of the board. The larger the diameter of rolls 24, 26, the higher the load must be to produce the necessary pressure on board 20. In general, the hotter the water 22, the lower the required pressure and the faster may be the travel through rolls 24, 26.

The humidification of high density wood fiber hardboard, having a specific gravity of over 1.0 subsequent to the high temperature, high pressure consolidation step, is carried out in essentially the manner above described for humidification of low density board, with the exception that, due to the obvious lesser compressibility of hardboard, roll loads of about two to five times as great as for low density board have been found necessary to provide the rapid uniform humidification to the normal degree of about 5% to 9% moisture desired for hardboard. On very incompressible hardboards, multiple sets of pressure rolls 24, 26 may be desired, especially at high speeds, to attain the desired humidification.

Figure 3:
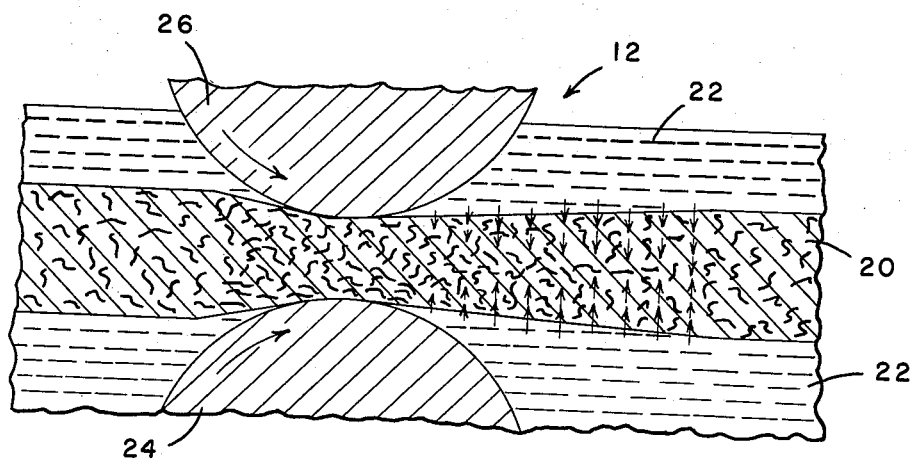
FIG. 3 is a fragmentary side sectional view of a portion of the wood fiber sheet of FIG. 2 showing the reexpansion action which provides the uniformity of humidification by a controlled suction of the surrounding water.

The fragmentary sectional view of FIG. 3 shows the manner in which the exceptionally uniform humidification of the method of the invention occurs. After being compressed between the nip of the rolls 24, 26 and emerging therefrom, the board 20 substantially immediately springs back to substantially the original thickness, while totally submerged in water. This re-expansion in accordance with the invention, has been found to cause an unusually even distribution of the water throughout the total extent of the sheet, markedly superior to prior methods, which prior methods also involved substantially greater processing time. This distribution of the water is sufficiently uniform such that, by a subsequent slight amount of capillary action within the board, any final further distribution occurs as necessary to provide complete uniformity of humidification.

Having completed a detailed disclosure of the preferred embodiments of my invention so that those skilled in the art may practice the same, I contemplate that variations may be made without departing from the essence of the invention or the scope of the appended claims.

I claim:
1. The method of increasing, under controlled conditions, the moisture content of a substantially dry manufactured wood fiber sheet comprising the steps of roll pressing a substantially dry manufactured wood fiber sheet while submerged in water and under pressure sufficient to lessen the thickness thereof not substantially exceeding the elastic limit thereof, and maintaining the said sheet submerged in water immediately after removal from said roll pressing for a period of time sufficient to permit suction of water into the interstices of said sheet.

2. The method of uniformly humidifying a substantially dry manufactured wood fiber sheet comprising the steps of passing a susbtantially dry manufactured wood fiber sheet of substantially uniform normal thickness and density therethroughout, between a pair of opposed rotatable press rolls, compressing the portion of said sheet disposed between said press rolls and while submerged in water to a uniform thickness less than the said normal thickness of said sheet, not substantially exceeding the elastic limit thereof, maintaining substantially uniform pressure of said rolls on said sheet throughout the passage of the entire extent of said sheet between said rolls, and maintaining all respective portions of said sheet fully submerged in water for substantially uniform periods of time immediately following the removal of said portions from between said rolls.

3. The method of claim 2 wherein said sheet has a normal, dry specific gravity of about .4 and wherein said pressure of said rolls on said sheet is about 300 pounds per lineal inch and said rolls have a diameter of about six inches.

4. The method of claim 2 wherein said sheet has a normal, dry specific gravity of over 1.0 and wherein said pressure of said rolls is about 600 to 1500 pounds per lineal inch and said rolls have a diameter of about six inches.

5. The method of claim 2 wherein said sheet has a normal, dry specific gravity of about .4, the pressure of said press rolls on said sheet is about 300 pounds per lineal inch, the diameter of said press rolls is about six inches, the temperature of said water is about 150° F., and the rate of travel through said rolls is about 100 feet per minute.

6. The method of claim 2 wherein said sheet has a normal, dry specific gravity of over 1.0, the pressure of said press rolls on said sheet is about 600 to 1500 pounds per lineal inch, the diameter of said press rolls is about six inches, the temperature of said water is about 150° F., and the rate of travel through said rolls is about 100 feet per minute.

References Cited in the file of this patent
UNITED STATES PATENTS

| | | |
|---|---|---|
| 1,502,311 | Mason | July 22, 1924 |
| 1,952,664 | Esselen | Mar. 27, 1934 |

OTHER REFERENCES

Quotation from page 141, Scientific American, Aug. 26, 1893.